(12) United States Patent
Shah et al.

(10) Patent No.: US 9,970,758 B2
(45) Date of Patent: May 15, 2018

(54) HIGH SPEED STEREOSCOPIC PAVEMENT SURFACE SCANNING SYSTEM AND METHOD

(71) Applicant: Fugro Roadware Inc., Mississauga (CA)

(72) Inventors: Hitesh Shah, Mississauga (CA); Prasanna Kumar Sivakumar, Austin, TX (US); Ishar Pratap Singh, Mississauga (CA); Miroslava Galchinsky, Mississauga (CA); David Lowe, Mississauga (CA)

(73) Assignee: FUGRO ROADWARE INC., Mississauga, Ontario (CA)

( * ) Notice: Subject to any disclaimer, the term of this patent is extended or adjusted under 35 U.S.C. 154(b) by 0 days. days.

(21) Appl. No.: 15/666,846

(22) Filed: Aug. 2, 2017

(65) Prior Publication Data

US 2017/0350698 A1    Dec. 7, 2017

Related U.S. Application Data

(63) Continuation of application No. 15/653,873, filed on Jul. 19, 2017, which is a continuation-in-part of application No. 14/996,803, filed on Jan. 15, 2016.

(30) Foreign Application Priority Data

Jul. 19, 2017    (CA) ...................................... 2973959

(51) Int. Cl.
*H04N 5/76*      (2006.01)
*G01C 7/04*      (2006.01)
(Continued)

(52) U.S. Cl.
CPC ................ *G01C 7/04* (2013.01); *E01C 23/01* (2013.01); *E01C 23/07* (2013.01); *E01C 23/08* (2013.01); *G01B 11/30* (2013.01)

(58) Field of Classification Search
None
See application file for complete search history.

(56) References Cited

U.S. PATENT DOCUMENTS 4,958,306 A    9/1990   Powell et al.
6,821,052 B2   11/2004  Zurn
(Continued)

FOREIGN PATENT DOCUMENTS

JP      63284409       11/1988
WO      WO2011023244   3/2011

OTHER PUBLICATIONS

Wang, Kelvin C.P. and Gong, Weiguo, Automated Real-Time Pavement Crack Detection and Classification, Transportation Research Board, May 2007 http://onlinepubs.trb.org/onlinepubs/archive/studies/idea/finalreports/highway/NCHRP111Final_Report.pdf.

(Continued)

*Primary Examiner* — Eileen M Adams

(57) ABSTRACT

There is disclosed a mobile pavement surface scanning system and method, In an embodiment, the system comprises one or more stereoscopic image capturing devices synchronised with one or more light sources mounted on the platform for illuminating a pavement surface, mounted on a mobile survey platform that provides a trigger mechanism to capture sequential image pairs of the illuminated pavement surface and a movement sensor that continuously measures the movement of the platform and a synchronization signal for time or distance synchronized image capture with accurate GPS positioning. One or more computers process the synchronized images captured stamps the images with one or more of time and distance data, GPS location and calculated 3D elevation for each point on the pavement surface using stereoscopic principles, and assesses the qual- (Continued)

ity of the pavement surface to determine the level of pavement surface deterioration.

20 Claims, 8 Drawing Sheets

(51) Int. Cl.
*G01B 11/30* (2006.01)
*E01C 23/01* (2006.01)
*E01C 23/07* (2006.01)
*E01C 23/08* (2006.01)

(56) References Cited

U.S. PATENT DOCUMENTS

| | | | |
|---|---|---|---|
| 7,616,329 | B2 | 11/2009 | Villar et al. |
| 7,697,727 | B2 | 4/2010 | Xu et al. |
| 7,801,333 | B2 | 9/2010 | Laurent et al. |
| 7,850,395 | B1 | 12/2010 | Brenner et al. |
| 8,306,747 | B1 | 11/2012 | Gagarin et al. |
| 9,049,433 | B1 | 6/2015 | Prince |
| 2003/0137673 | A1 | 7/2003 | Cox |
| 2004/0160595 | A1 | 8/2004 | Zivkovic |
| 2011/0118967 | A1* | 5/2011 | Tsuda .................. B60W 30/10 701/117 |
| 2011/0221906 | A1 | 9/2011 | Xu et al. |
| 2012/0314129 | A1* | 12/2012 | Mertens ................. G11B 27/11 348/474 |
| 2013/0018575 | A1 | 1/2013 | Birken |
| 2013/0046471 | A1 | 2/2013 | Rahmes et al. |
| 2013/0051913 | A1 | 2/2013 | Eul |
| 2013/0076871 | A1 | 3/2013 | Reeves |
| 2013/0136539 | A1 | 5/2013 | Aardema |
| 2013/0155061 | A1* | 6/2013 | Jahanshahi ............. G06T 15/00 345/419 |
| 2013/0329052 | A1 | 12/2013 | Chew |
| 2014/0303853 | A1* | 10/2014 | Itoh ......................... B60R 11/04 701/49 |
| 2014/0314279 | A1 | 10/2014 | Zhang et al. |
| 2014/0347485 | A1 | 11/2014 | Zhang et al. |
| 2014/0375770 | A1 | 12/2014 | Habel et al. |
| 2015/0204687 | A1* | 7/2015 | Yoon .................. G01C 21/3658 701/436 |
| 2015/0371094 | A1 | 12/2015 | Gardiner et al. |
| 2016/0076934 | A1* | 3/2016 | Low .................. G06K 9/00791 250/208.1 |

OTHER PUBLICATIONS

Wang et al., Automated Imaging Technologies for Pavement Distress Surveys, Transportation Research Circular E-C156, Jul. 1, 2011 http://onlinepubs.trb.org/onlinepubs/circulars/ec156.pdf.
Fraunhofer Institute, Pavement Profile Scanner pps, Fraunhofer Institute for Physical Measurement Techniques IPM, Jan. 1, 2015 http://www.ipm.fraunhofer.de/content/dam/ipm/en/PDFs/Product %20sheet/OF/LSC/pavement-profile-scanner.pdf.
Koch et al., Pothole Detection in Asphalt Pavement Images, Advanced Engineering Informatics 25 (2011) 507-515, Aug. 1, 2011 https://scholar.google.com/scholar?espv=2&biw=1184&bih=598 &um=1&ie=UTF-8&lr&cites=8790872854322534042.

* cited by examiner

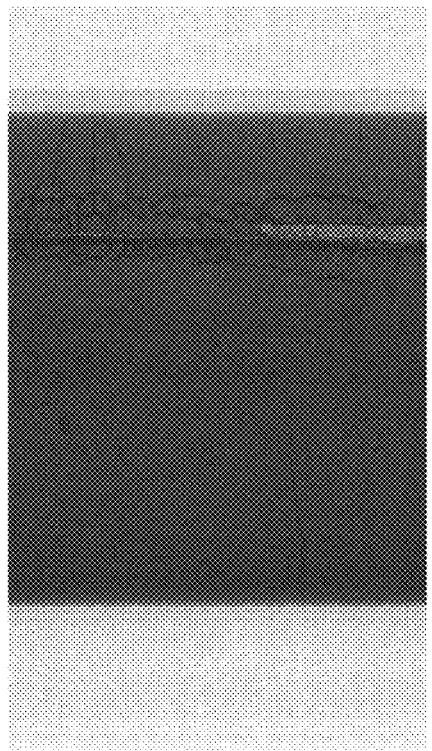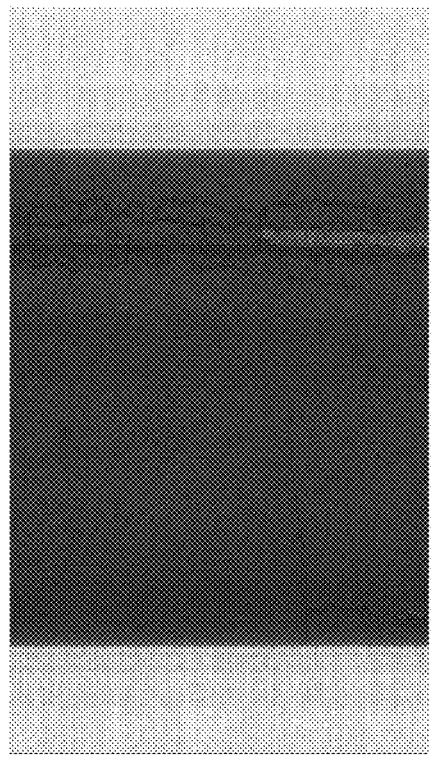
FIG. 5

HIGH SPEED STEREOSCOPIC PAVEMENT SURFACE SCANNING SYSTEM AND METHOD

CROSS-REFERENCE TO RELATED APPLICATIONS

This application is a continuation-in-part of U.S. patent application Ser. No. 14/996,803 filed on Jan. 15, 2016, which is hereby incorporated by reference in its entirety.

FIELD

This disclosure relates broadly to surface digitization systems and methods for accurate detection and assessment of pavement profiles and three dimensional (3D) surfaces for the purposes of measuring the condition of the pavement.

BACKGROUND

An accurate assessment and identification of road pavement surfaces is required for timely maintenance of roads (pavements). Pavements develop many different modes of distresses over time, including but not limited to cracking, rutting, faulting, ponding, spalling and ravelling (i.e. on-going separation of aggregate particles in a pavement). The condition of the pavement can be determined by assessing the type, extent, relative and absolute location, and severity of each of these different types of distresses, and remedial measures can be applied to fix these problems. In addition, it is also important to measure the roughness and texture of pavements periodically. Textures helps to measure the skid resistance, and roughness measures the level of traveler comfort and impact on fuel efficiency.

Pavement surface conditions are usually assessed using survey vehicles which continually collect pavement surface data as they travel along their designated routes. A number of pavement condition assessment systems have been built in the past four decades. These systems use different sensors to digitize the road surface and roughly fall under one of the following two categories:

(1) Imaging systems, which use a camera or sets of cameras and lighting systems to record a view of the pavement surface. These systems usually use high resolution line scan cameras for accurate imaging. The individual lines scanned by the camera are stitched after some distance to get a two-dimensional image of the area scanned. They capture an entire area of the lane in which the survey vehicle is travelling in. Surface data captured with these systems are usually used for distress detection. However, these systems are two-dimensional (2D) as opposed to three-dimensional (3D).

(2) Profiling systems, which use laser triangulation, ultrasound or other time of flight sensors to record the elevation map of the pavement surface. These systems do not measure the entire surface of the road, but rather produce profiles at fixed intervals along a fixed number of lines on the road. While these systems are highly accurate and measure discrete points across the surface of the road, these systems take discrete measurements and therefore do not by their nature take images, as the 2D imaging systems described above do.

The recorded road surface is then either assessed manually or automatically according to various pavement assessment standards.

Stereoscopy is the extraction of three dimensional (3D) elevation information from digital images obtained by imaging devices such as CCD and CMOS cameras. By comparing information about a scene from two vantage points 3D information can be extracted by examination of the relative position of objects in the two panels. This is similar to the biological process Stereopsis, a process by which the human brain perceives the 3D structure of an object using visual information from two eyes.

In the simplest form of the technique, two cameras displaced horizontally from one another are used to obtain two differing views on a scene. By comparing these two images, the relative depth information can be obtained, in the form of disparities, which are inversely proportional to the differences in distance to the objects. To compare the images, the two views must be superimposed in a stereoscopic device or process.

For a two camera stereoscopic 3D extraction technique, the following steps are performed:
(a) Image Rectification: Transformation matrix $R_{rect}$ transforms both the images to one common plane of comparison is identified. The left camera image is rectified by applying $R_{rect}$ and the right camera image by applying $R*R_{rect}$ to all the pixels.
(b) Disparity Map generation: For each pixel on the left camera image a matching pixel along the same scan line is identified on the right camera image using a localized window based search technique. For each pixel, $p_l(x,y)$ in the left image, the system and method identifies the matching pixel $p_r(x+d,y)$ in the right pixel where d is the pixel disparity.
(c) 3D reconstruction: At each point $d_{(x,y)}$ in the disparity map, the system and method calculates the elevation $Z_{(x,y)}$ by triangulation.

Stereoscopy has been used for pavement quality assessment in U.S. Pat. No. 8,306,747. The system utilizes Ground Penetrating Radar (GPR) along with stereo area scan cameras to obtain high resolution images, and is not designed for operation at highway speeds. The system also does not use the image data directly for distress detection and measurement.

Techniques similar to multiple-camera stereoscopy like photometric stereoscopy has also been used in pavement assessment in Shalaby et al. ("Image Requirements for Three-Dimensional Measurements of Pavement Macrotexture", Journal of the Transportation Research Board, Issue Volume 2068/2008, ISSN 0361-1981.) However, the system uses a conventional camera with four single point light sources, and is not designed for high-speed operation. The technique is used to characterize pavement surface textures.

Stereoscopic imaging has also been used for inspection of objects on a conveyor belt using both individual photosensors (U.S. Pat. No. 3,892,492) or using a line-scan camera U.S. Pat. No. 6,166,393 and U.S. Pat. No, 6,327, 374). They are also specifically designed to identify defective rapidly moving objects moving on a conveyor belt past a stationary sensor system, rather from a moving platform for road pavement evaluation.

What is therefore needed is an improved system and method for pavement scanning that overcomes some of the disadvantages of the prior art.

SUMMARY

The present disclosure relates to a high speed pavement stereoscopic line scan imaging system and method capable of producing a stereoscopic 3D image of the pavement surface using a stereoscopic image capturing apparatus, or any number of such devices and lighting source(s) for accurate assessment of the pavement surface quality. The present system and method can be applied to capturing and assessment of any type of pavement or vehicle pathway surface, such as road pavements, bridge decks and airport runways and railways.

In an embodiment, the system comprises a movable platform by way of a survey vehicle. An illumination module, comprising at least one light source, is provided on the platform, and is used to illuminate the pavement surface uniformly across an image capture area. The light source may be of any type, wavelength and power. Multiple similar light sources may be used for this purpose depending on the width of the pavement surface being captured and/or the power and design limitations of the movable platform it is mounted on. The purpose of the light source is to provide an evenly lit surface free of shadows or large deviations in lighting that could be mistaken for features.

An image capturing module, comprising at least one stereoscopic image capturing device mounted on the survey platform, captures simultaneous images sequentially of the illuminated pavement surface. The image capturing device may be externally fitted with any type of lens filters or optical filters, depending on the pavement assessment needs and environmental challenges. The lens field of view will match the region of interest of the survey activity and the optical filter will match the wavelength(s) of light being used to illuminate the region of interest.

Distance Measurement Instruments (DMI), such as a combination of positioning sensors, encode the movement of the survey vehicle carrying the platform and provides a synchronization signal for triggering the images to be captured by the stereoscopic image capturing device. The triggering system may also be used to trigger the lighting system in synchronization with the image capturing device to generate more light with less power consumption or simply less power consumption with each captured image.

The system further includes at least one computer with processing means that synchronizes the images captured by the individual cameras in a stereo pair, and stamps (tags) the images with at least one of time and location information.

The computer system calculates the 3D elevation for each point on the pavement surface using stereoscopic principles, assesses the quality of the pavement surface, and measures the level of deterioration. The computer processor may be a standalone processor operatively connected to a camera and peripheral equipment, or the computer processor may be a part of the camera itself. A computer may possibly be embedded in the CMOS sensor unit for dedicated image processing functions, for example.

By comparing information about a scene from two simultaneous vantage points, the computer system extracts 3D information by examination of the change in relative position of features on the two overlapping images simultaneously captured by the line scan camera.

In an embodiment, the two images are calibrated to one another such that a particular point on sensor A matches to another specified point on sensor B when looking at a flat surface. Feature detection is then run on the images to assess the relative elevation of each pixel based on the lateral opposing shift of the detected features in both views.

In another aspect, there is provided a method of detecting pavement deterioration and assessing the pavement quality, including the steps of: illuminating a pavement surface from a light source or multiple similar sources; capturing images of the illuminated surface using one or more stereoscopic image capturing devices; processing the captured images to synchronize the images captured, and calculating the 3D elevation for each point on the pavement surface.

Further features will be evident from the following description of preferred embodiments. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 5 shows sample grayscale images of a pavement surface captured by left and right cameras of a stereoscopic image capturing device in accordance with an illustrative embodiment.

DETAILED DESCRIPTION OF THE INVENTION

As noted above, the present disclosure relates to a system and method for collecting high resolution 3D image of the pavement surface at high speed. The purpose of the system and method is to collect information that allows a more accurate measurement of various different modes of distress that have formed on a road pavement surface. These measurements can then be used to manually or automatically assess road condition, such as cracking, roughness, smoothness, rutting and both micro and macro surface texture.

In an embodiment, with reference to FIGS. 1 to 4B, the proposed system is mounted to a survey vehicle, and comprises a number of elements: (1) A number of high brightness illumination units, suitably two LED sources 130A and 130B (in an embodiment, these may be of blue wavelength ranging from about 450 nm to 495 nm, and more preferably around 480 nm, but other colors and corresponding wavelengths may be used); (2) A number, suitably two, of stereoscopic image capture devices 104A and 104B which may include pairs of high speed line scan cameras 120A & 120B, 120C & 120D, and frame grabbers 150A and 150B with each of the cameras externally fitted with an optical filter 103A, 103B; (3) A combination of wheel-encoder 105A, GPS 105B and IMU 105C mounted to the vehicle allowing movement detection; and (4) A data-storage 510 and processing 520 means.

In an embodiment, the light sources 130A, 130B used to illuminate an area of interest are adapted to receive a trigger pulse to synchronize the output of the light sources 130A, 130B with the image capturing device. The intensity of the light output by the light sources 130A, 130B may be modified depending on the amount of illumination a pavement surface requires, in order to synchronize with the image capturing device and capture images with a suitable level of contrast. The intensity of the light output by the light sources 130A, 130B may also be controlled by an exposure level sensor, such as an exposure level meter built into the camera providing a feedback signal. The camera lens aperture and the sensitivity of the camera image sensor may also be controlled in order to obtain a proper level of exposure for a given lighting condition.

The illumination system 130 may be one very powerful illumination source that covers the entire width of a pavement surface of interest, or multiple illumination sources comprising one or more LED sources 130A, 130B that together cover the width of the pavement surface of interest.

Figure 1:
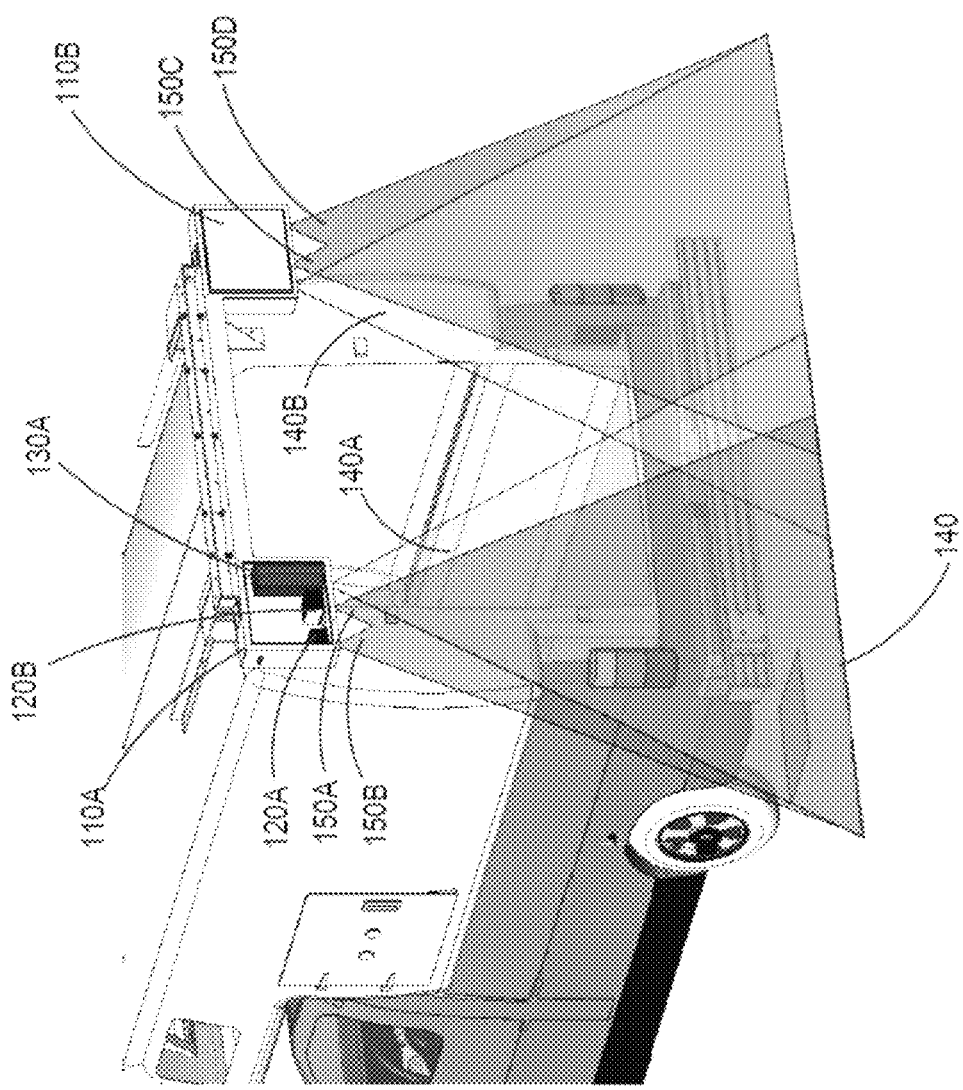
FIG. 1 shows one possible configuration of the scanning system mounted on the survey vehicle. The system shown has two pairs of stereoscopic line-scan cameras and two light sources in accordance with an illustrative embodiment.

When multiple sources are used, each source may be fitted together with an image capturing device, and housed together in a cabinet to be protected from environmental damages, as shown by way of example in FIG. 1. One or more supplemental illumination sources positioned separately from the cabinet may also be used as necessary in order to achieve proper illumination of the pavement surface. FIG. 1 shows an illustrative vehicle mounted system with two such cabinets 110A, 110B which are mounted at the upper left corner and upper right corner of the rear of the vehicle. As shown, these two units may be interconnected via cables through a ducted frame holding the two cabinets in position. The two light sources 130A and 130B continuously illuminate the width of the pavement as the vehicle travels forward, in order to allow the one or more stereoscopic image capture devices to record a sequence of pavement surface images.

When multiple sources are used, a part of the width of the pavement illuminated by one source may overlap with the width illuminated by the others as shown in FIG. 1. In FIG. 1 coverage width 140 is obtained by coverage width 140A from a first light source 130A which partially overlaps with coverage width 140B from a second light source 130B inside the second cabinet 110B.

In an embodiment, the orientation of the light source 110 with respect to the pavement surface is determined by the cabinet. Inside the cabinet, the light source is placed with no rotation, with the beam parallel to one of the long faces of the cabinet as shown in FIG. 1. The light sources 130A, 130B may also be positioned at appropriate angles and distances relative to each other in order to provide optimal lighting conditions for obtaining a sufficiently high contrast image of the pavement surface features.

Figure 2:
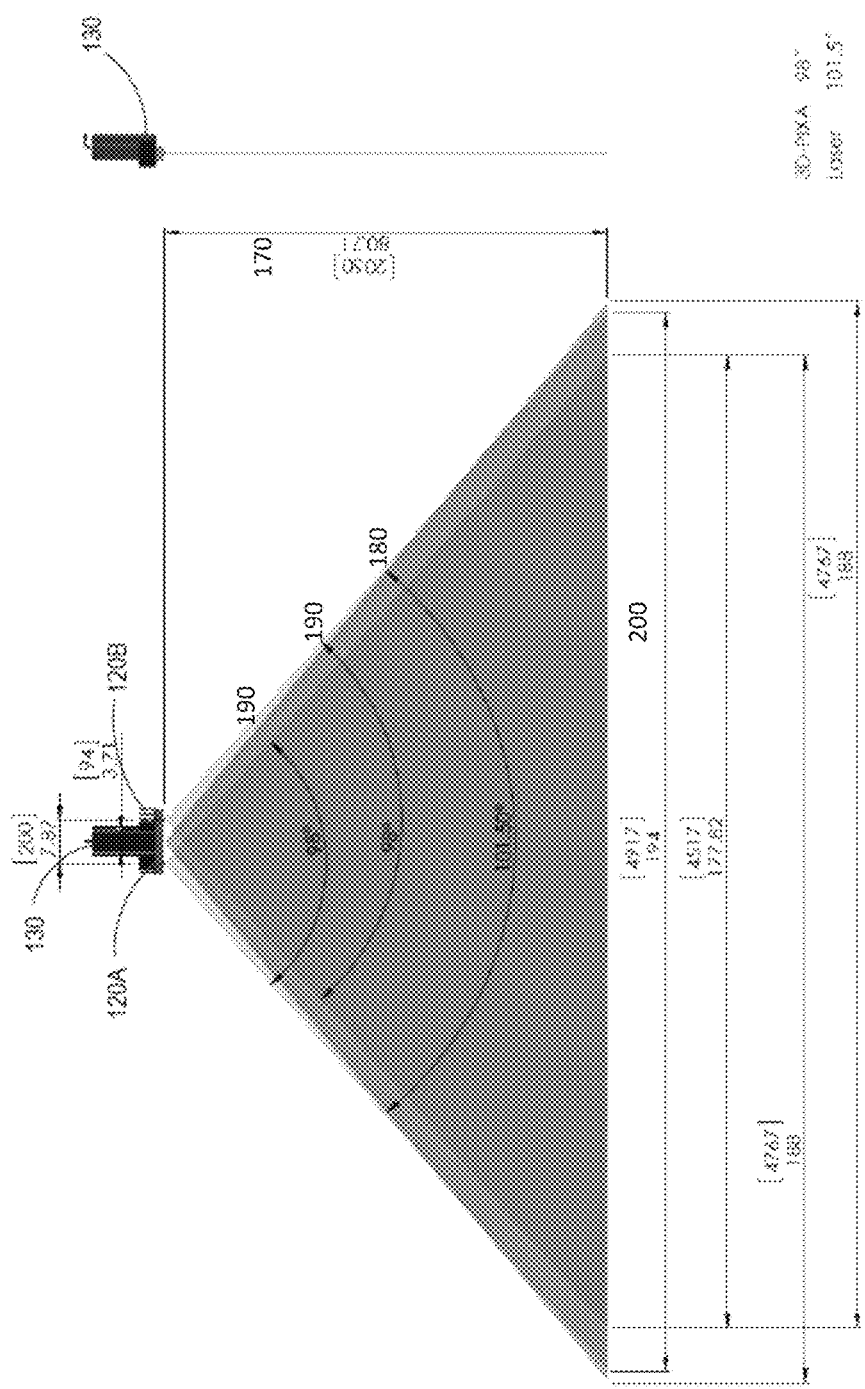
FIG. 2 is one possible configuration of a stereoscopic line-scan camera pair and a light source shown together in accordance with an illustrative embodiment.

The image capturing system 104, may be one wide-angle stereoscopic image capturing device or multiple medium-angle or narrow-angle devices that capture the width of the pavement. A stereoscopic image capturing device 104A consists of two cameras, left camera 120A and right camera 120B. Both the left and right cameras capture almost the same width of the pavement 140A and 140B, as shown in FIG. 1 and FIG. 2, which forms the basis of 3D depth (range) estimation using stereoscopic principles. Each camera may be a single integrated unit or a separate high speed line scan camera 120 and frame grabber 150 A and 150B.

Depending on the width 140 of the pavement surface to be captured and the width 140A, 140B that a single stereoscopic pair can capture, multiple similar pairs may be used as shown in FIG. 1. Similar to the illumination system, when multiple image capturing devices are used, the width of the pavement captured by one stereoscopic pair may overlap with the width captured by the others as shown in FIG. 1.

Each of the cameras in a stereoscopic camera pair may be fitted with an optical filter or lens filter 103A and 103B externally or internally to overcome the environmental challenges like abnormal sunlight condition or wet pavements.

Figure 4A:
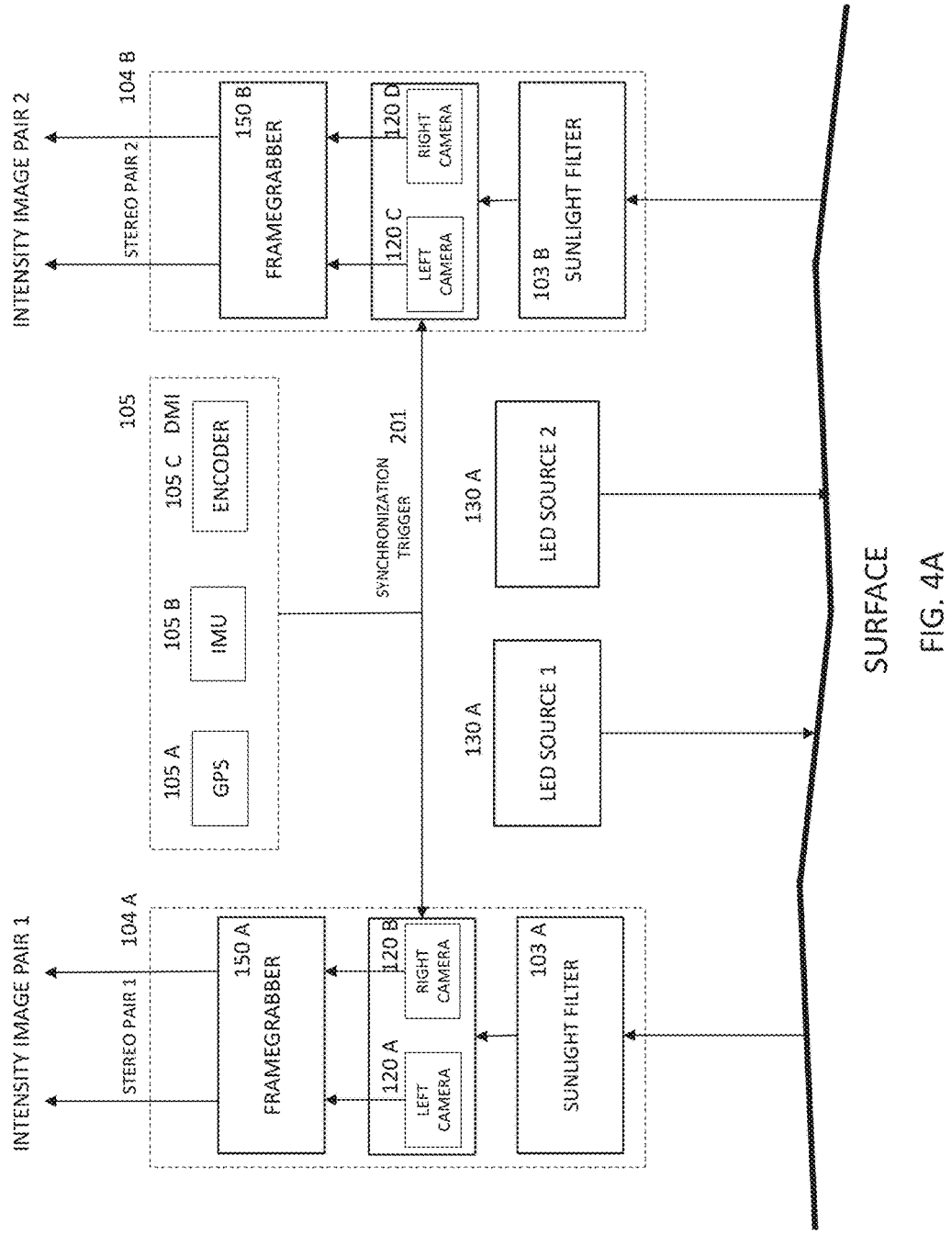
FIG. 4A is a schematic block diagram the data capture scheme used for the scanning system in accordance with an illustrative embodiment.

FIG. 4A shows one possible configuration of a Data Capturing System. The image capturing system with two high speed stereoscopic line scan camera pairs 104A and 104B, in combination with optical filters that are matched to the wavelength of the light source, 103A and 103B, captures the pavement surface at high resolution, using frame grabber cards 150A and 150B. The illumination system with two LED light sources 130A and 130B illuminates the pavement surface.

Figure 3:
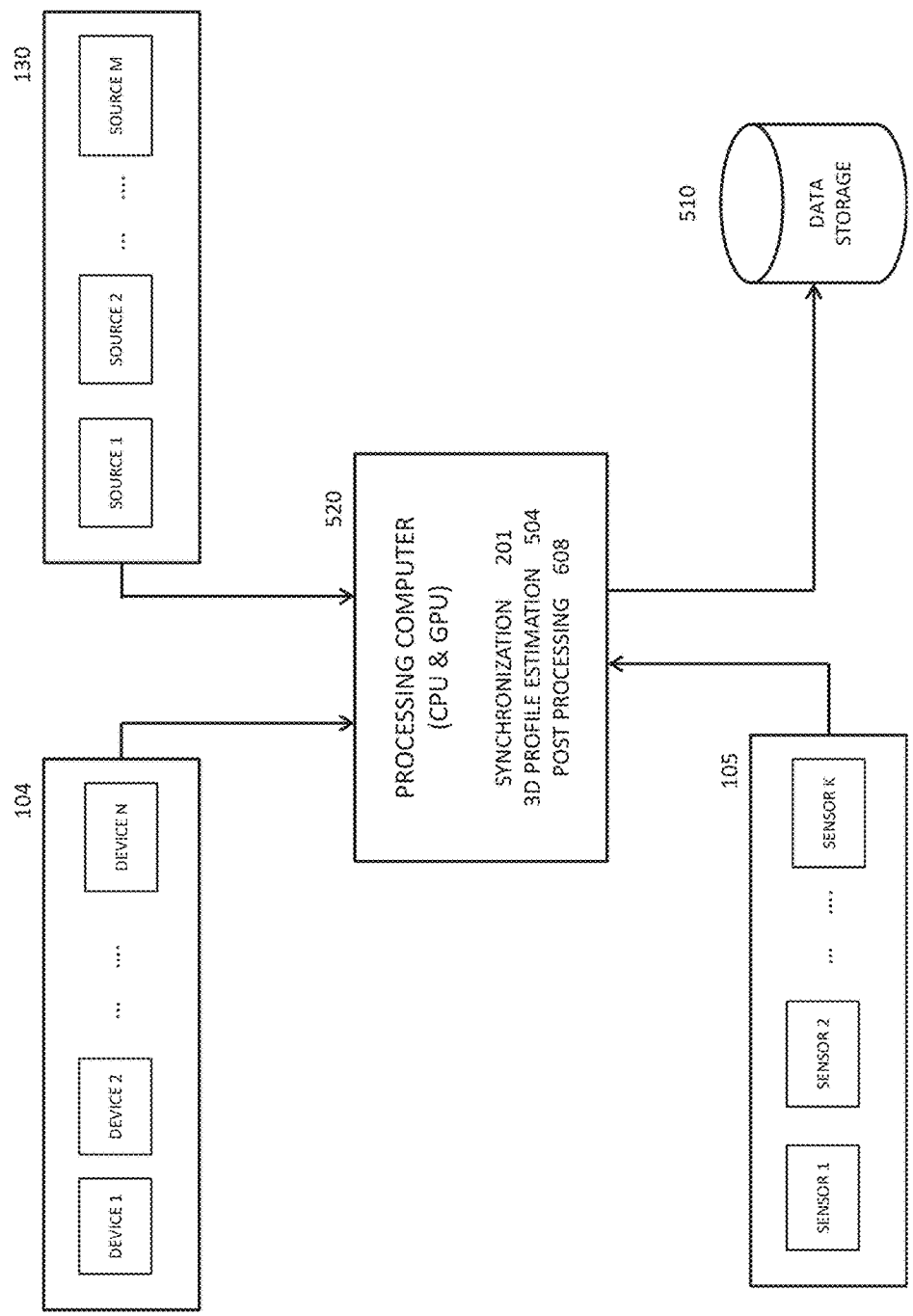
FIG. 3 is a schematic block diagram of the scanning system in accordance with an illustrative embodiment.
Figure 4B:
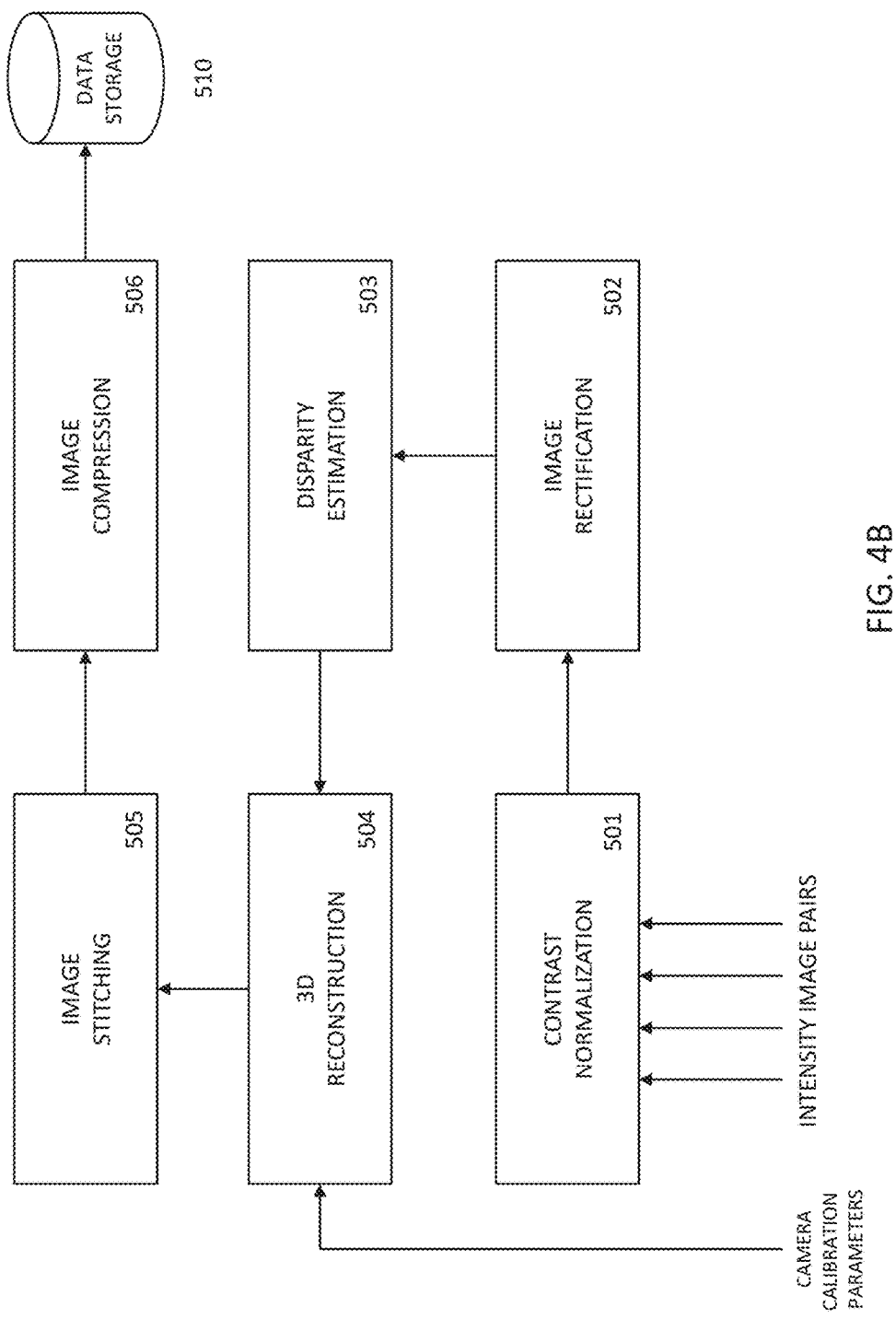
FIG. 4B. is a schematic block diagram of the image processing scheme used for the scanning system in accordance with an illustrative embodiment.

A combination of a Global Positioning System (GPS) 105A, Inertial Measurement Unit (IMU) 105B and Wheel Encoder 105C, collectively referred to as Distance Measurement Instruments (DMI) 105, detects the movement of the system as shown in FIG. 3. The individual sensors are placed at different locations inside the survey vehicle. Together, they capture any movement of the survey vehicle such as longitudinal distance travelled, velocity in the direction of travel and angle of tilt relative to pavement surface. DMI also produces synchronization signals 201 based on distance travelled by the survey vehicle which is used to trigger the stereoscopic cameras for synchronized data capture independent of the vehicle velocity as shown in FIG. 4B. DMI may also produce the synchronization signals based on the time elapsed.

The movement data from the IMU is used to augment the data captured by the image capturing devices to correct for pavement abnormalities and obtain more accurate 3D estimates. For example, if the vehicle is travelling over an uneven surface or stretch of banked pavement which is angled to one side or when the vehicle bounces, the IMU data is used to account for the movement of the system relative to the pavement surface.

As the survey vehicle travels forward, the image capturing devices are triggered at equal distance or time intervals, in rapid succession, by the DMI. In an embodiment, this trigger pulse may be generated using an encoder or vehicle speed sensor 105C, connected to the drive train or directly to the wheel. At each pulse, the individual cameras of a stereoscopic pair capture a line of pavement surface illuminated by the illumination source. The captured lines are then digitized into a line of grayscale intensities using the frame grabber card. The frame grabber captures a fixed number of such lines and stitches them together one line after another to form a two dimensional (2D) image.

In this illustrative embodiment using a pair stereoscopic cameras, the result is a set of four, time or distance synchronized, 2D intensity images containing image intensity data. The intensity images captured by the left and right cameras of one of the two stereoscopic pairs of a sample system are shown in FIG. 5.

At this stage, the images are processed and saved as shown in FIG. 4B. Image processing comprises of external artifact removal 501, image rectification 502, disparity estimation 503, 3D depth (range) estimation 504, image stitching 505, and image compression 506. Image processing is performed on-board 520, as the vehicle travels. Alternatively these steps can be done in a post-processing stage.

As shown in FIG. 4B, the first step in image processing is to reduce the effect of sunlight and shadows within the images. Initially, the optical filters on the stereoscopic cameras reduce the effects of sunlight. However to obtain good contrast images with accurate gradient estimates, further reduction of the effects of sunlight is often necessary. To rectify this problem, an ancillary image of the surface can be taken with no artificial lighting, only sunlight. This image with only sunlight illuminating the surface is then used to remove the effect of sunlight in the other images collected by the system. This is performed after each of the images has been aligned, as described previously. By subtracting the sunlight only image from the original images using digital processing, sunlight free images can be produced. This technique also removes the effect of imaging sensor DC bias. Alternatively, if an ancillary image without artificial lighting cannot be taken, this step may be replaced with simple contrast normalization techniques 501 which effectively spread out the most frequent intensity value.

Once the external artifacts have been removed from the images, the technique of stereoscopy is applied to the data. This produces the 3D elevation at each point on the pavement surface. The preferred technique uses images from two individual cameras of the stereo pair and for each point on the pavement, identifies the corresponding pixel on both the images and estimates the 3D elevation as a factor of relative pixel distance between the matching pixels. The stereo camera pairs are calibrated and the focal length (f), principal centers (P) of the individual cameras and the relative rotation (R) and Translation (T) between the two cameras are known.

The following steps are performed:

(a) The first step is Image Rectification 502. The system and method identifies a common $R_{rect}$ matrix that when applied will transform the left and right images to a common plane where they can be compared pixel to pixel. The system and method determines this $R_{rect}$ matrix using the Translation vector (T).

$$e_1 = \frac{T}{\|T\|} \quad e_2 = \frac{1}{\sqrt{T_x^2 + T_y^2}}[-T_y, T_x, 0]'$$

$$e_3 = e_1 \times e_2 \quad R_{rect} = \begin{bmatrix} e_1' \\ e_2' \\ e_3' \end{bmatrix};$$

The system and method rectifies the left image by applying the $R_{rect}$ matrix to each pixel in the image. For each pixel, $p_1$ the system and method computes $R_{rect} * p_1$. Similarly the system and method rectifies the right image by applying $R*R_{rect}$ to each pixel. For each pixel, $p_r$, the system and method computes $R*R_{rect}*p_r$. This transforms both the images to one common plane for easy comparison.

(b) The next step is to generate a Disparity Map 503. For each pixel in the left image, the system and method identifies a matching pixel in the right image. Since the images are rectified, the search space to identify the matching pixel is limited to the corresponding scan line. The system and method uses a localized window based correlation technique to identify the matching pixels. For each pixel, $p_l(x,y)$ in the left image, the system and method identifies the matching pixel $p_r(x+d,y)$ in the right pixel where d is the pixel disparity.

(c) The final step is 3D reconstruction 504. At each point $d_{(x,y)}$ in the disparity map the system and method calculates the elevation $z_{(x,y)}$ by triangulation.

$$Z_{(x,y)} = \frac{T_x * f}{d_{(x,y)}}$$

The 3D pavement profile, obtained using the disparity image which is obtained using the grayscale images shown in FIG. 5, is shown in FIG. 7.

Once the 3D range maps are obtained from the stereo pairs, at 505, the system and method stitches the range maps obtained by the stereo pairs to obtain one 3D range map for the entire region of interest.

After image capturing, stereoscopic 3D reconstruction and image stitching, the images obtained are contrast normalized intensity images containing image intensity data (which may be gray scale), and 3D elevation/depth range images which are combined into a stereoscopic 3D image containing image intensity data. This stereoscopic 3D image is viewable as a 3D image rendered on a 2D computer monitor or screen, or viewable in stereoscopic 3D with suitable 3D glasses. With appropriate formatting as may be necessary, the 3D image may also be viewed in a virtual 3D environment, using a commercially available stereoscopic virtual reality viewer, for example. Such a virtual 3D viewing environment may render pavement distress features in the stereoscopic 3D image to be more readily noticeable, in comparison to a flattened rendering of a 3D image on a 2D computer monitor or screen. Once such a feature is identified, the viewing angle of the 3D image may also be manipulated to allow the pavement surface to be viewed from different points of view.

A file compression 506 technique such as GeoTIF, JPEG encoding, ZIP encoding and LZW encoding is applied to minimize the sizes of the combined stereoscopic 3D images, and save them to a data storage device 510 on board.

Figure 4C:
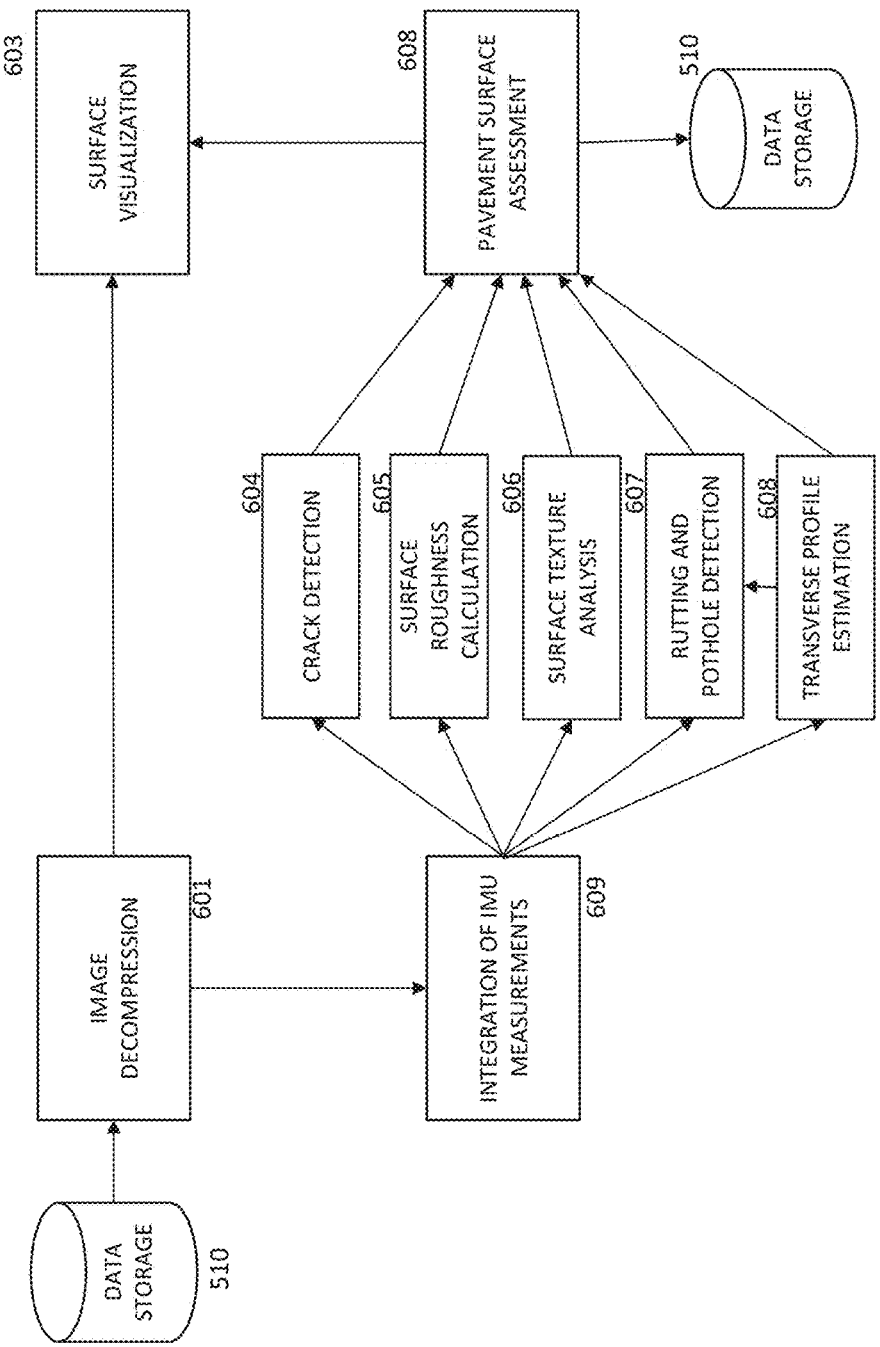
FIG. 4C. is a schematic block diagram of the data post-processing scheme used for the scanning system in accordance with an illustrative embodiment.
Figure 6:
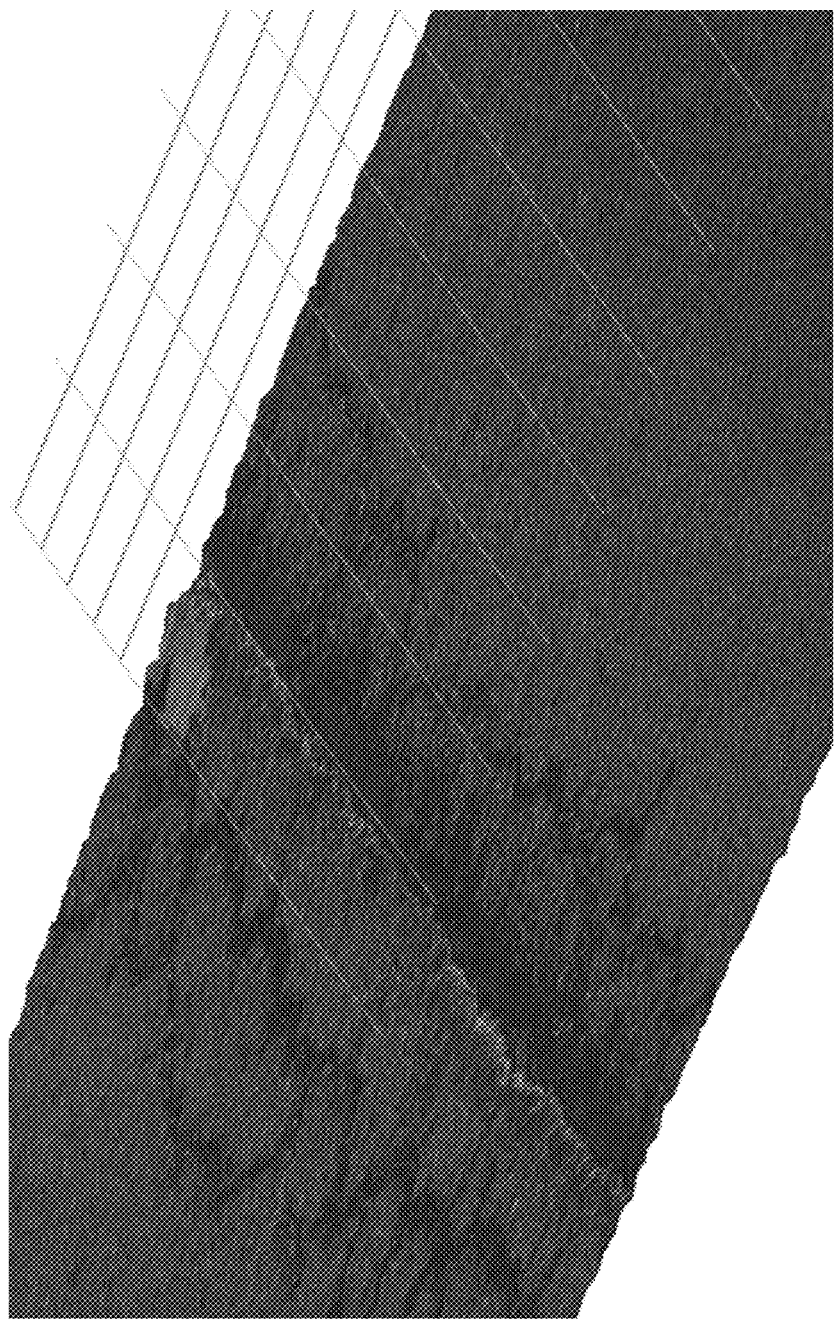
FIG. 6 shows a representative 3D image of the pavement surface obtained using the images shown in FIG. 5 in accordance with an illustrative embodiment.

Any or all of the steps involved in image processing stage can be performed by one or multiple units of Central Processing Unit (CPU) 520A or Graphics Processing unit (GPU) 520B as shown in FIG. 4C.

At the post processing and extraction stage, the recorded data is retrieved from a data storage 510, decompressed 601, and then passed to a number of modules as shown in FIG. 4C.

The high resolution stereoscopic 3D image can be used to extract a number of pavement features. Through the automatic identification and classification of each of these features, an assessment of the road surface condition can be made 610. These include, but are not limited to:

(1) Identification of surface cracking (both sealed and unsealed) 604.
(2) Extraction of road roughness or smoothness 605.
(3) Identification of areas with low texture depth, which can be due to asphalt bleeding or polishing 606.
(4) Identification of pot holes and rutting 607.
(5) Identification of areas where there is surface depression or corrugation which can indicate areas of high moisture or voiding.
(6) Extraction of Transverse Profile for rutting estimation 608.

(7) Surface comparison between scans, allowing detection of surface change with time.

8) Identification and removal of spurious road targets such as sticks and other debris, which can confuse crack detection algorithms.

9) Identification of patches.

10) Identification of areas of water bleeding.

The 3D image can be used along with the contrast normalized intensity images containing image intensity data to improve the distress detection, especially, cracking 604. Cracks are identified both in the gradient and intensity images. Both the shape and intensity is then used to classify the features as cracks, sealed cracks or other road features. The main advantages over using just the 3D image is the ability to eliminate false targets, such as markings on the road. An example is an oil spill which is often incorrectly identified as a crack, as it will only appear within the intensity image, not the 3D range images. It also improves the identification of other surface features that could lead to false positives, such as road markings, wheel marks, sticks and other road debris.

Another highly useful element of the system is the ability to identify sealed distresses like sealed cracks. Cracks are often sealed using bitumen, which to a normal surface image camera still appear as a dark line within the image. With the stereoscopic 3D image estimation technique it is possible to detect the presence of the flat bitumen surface in contrast to the depression caused by an unsealed crack.

Modules may also employ Machine Learning techniques to detect the distresses. The modules, instead of employing a series of mathematical calculations with hard-coded constants (heuristic methods), learn the shape and structure of the distresses from manually labelled historical data and try to predict the presence of distress on the captured pavement image. Each distress type has unique characteristics and it repeats wherever the distress appears again. Machine learning based modules are proven to be more accurate than heuristic method employing methods for detecting objects in an image.

In the display module 603, the data produced can be displayed directly to the user on the on-board monitor. The display module may display just the intensity image or a combined intensity image and 3D elevation image. According to the user preferences, the module may also display the detected distresses overlaid on the intensity image. The distresses displayed may be color-coded in different colors to indicate the level of severity.

Thus, in an aspect, there is provided a mobile pavement surface scanning system, comprising: one or more light sources for illuminating a pavement surface at a selected wavelength; one or more stereoscopic image capturing devices for capturing sequential images of the illuminated pavement surface, the sequential images comprising intensity image pairs; a plurality of positioning sensors adapted to encode movement of the system and provide a synchronization signal for the intensity image pairs captured by the one or more stereoscopic image capture devices; and one or more computer processors adapted to: synchronize the intensity image pairs captured by each camera in the one or more stereoscopic image capturing devices; normalize the contrast of the intensity image pairs; rectify the intensity image pairs; calculate 3D elevation data for each point on the pavement surface using stereoscopic principles; and combine the contrast normalized intensity image pairs with the calculated 3D elevation data to create a stereoscopic 3D image for assessing the quality of the pavement surface using the 3D elevation data to determine the level of deterioration.

In an embodiment, the one or more light sources are light emitting diodes.

In another embodiment, the one or more light sources are lasers with line generating optics.

In another embodiment, the one or more stereoscopic image capturing devices comprise line scan cameras with frame grabbers.

In another embodiment, the system further comprises a synchronization module adapted to receive a signal from the plurality of positioning sensors, and provide a sequence of triggers to the line scan cameras for time synchronized image capturing.

In another embodiment, the synchronization module is further adapted to provide a sequence of triggers to the one or more light sources for time synchronized illumination of the pavement surface for image capturing.

In another embodiment, the one or more computer processors is further adapted to correlate the 3D elevation data with image intensity data to identify distressed regions of pavement in the stereoscopic 3D image.

In another embodiment, the one or more computer processors is further adapted to color-code the identified distressed regions of pavement in different colors to indicate the level of severity.

In another embodiment, the system further comprises optical filters matched to the selected wavelength of the one or more light sources for filtering the images of the illuminated pavement surface.

In another embodiment, the system further comprises polarizing filters for filtering the images of the illuminated pavement surface.

In another aspect, there is provided a mobile pavement surface scanning method, comprising: illuminating a pavement surface at a selected wavelength utilizing one or more light sources; capturing sequential images of the illuminated pavement surface utilizing one or more stereoscopic image capturing devices, the sequential images comprising intensity image pairs; utilizing a plurality of positioning sensors, encoding movement and providing a synchronization signal for the intensity image pairs captured by the one or more stereoscopic image capture devices; and utilizing one or more computer processors to: synchronize the intensity image pairs captured by each camera in the one or more stereoscopic image capturing devices; normalize the contrast of the intensity image pairs; rectify the intensity image pairs; calculate 3D elevation data for each point on the pavement surface using stereoscopic principles; and combine the contrast normalized intensity image pairs with the calculated 3D elevation data to create a stereoscopic 3D image for assessing the quality of the pavement surface using the 3D elevation data to determine the level of deterioration.

In an embodiment, the one or more light sources are light emitting diodes.

In another embodiment, the one or more light sources are lasers with line generating optics.

In another embodiment, the one or more stereoscopic image capturing devices comprise line scan cameras with frame grabbers.

In another embodiment, the method further comprises receiving at a synchronization module a signal from the plurality of positioning sensors, and providing a sequence of triggers to the line scan cameras for time synchronized image capturing.

In another embodiment, the method further comprises adapting the synchronization module to provide a sequence of triggers to the one or more light sources for time synchronized illumination of the pavement surface for image capturing.

In another embodiment, the method further comprises correlating the 3D range data with image intensity data to identify distressed regions of pavement.

In another embodiment, the method further comprises color-coding the identified distressed regions of pavement in different colors to indicate the level of severity.

In another embodiment, the method further comprises providing optical filters matched to the selected wavelength of the one or more light sources for filtering the images of the illuminated pavement surface.

In another embodiment, the method further comprises providing polarizing filters for filtering the images of the illuminated pavement surface.

Throughout the description and claims to this specification the word "comprise" and variation of that word such as "comprises" and "comprising" are not intended to exclude other additives, components, integrations or steps. While various illustrative embodiments have been described, it will be appreciated that these embodiments are provided as illustrative examples, and are not meant to limit the scope of the invention, as defined by the following claims.

The invention claimed is:

1. A mobile pavement surface scanning system, comprising:
   one or more light sources for illuminating a pavement surface at a selected wavelength;
   one or more stereoscopic image capturing devices for capturing sequential images of the illuminated pavement surface, the sequential images comprising intensity image pairs;
   a plurality of positioning sensors adapted to encode movement of the system and provide a synchronization signal for the intensity image pairs captured by the one or more stereoscopic image capture devices; and
   one or more computer processors adapted to:
     synchronize the intensity image pairs captured by each camera in the one or more stereoscopic image capturing devices;
     normalize the contrast of the intensity image pairs;
     rectify the intensity image pairs;
     calculate 3D elevation data for each point on the pavement surface using stereoscopic principles; and
     combine the contrast normalized intensity image pairs with the calculated 3D elevation data to create a stereoscopic 3D image for assessing the quality of the pavement surface using the 3D elevation data to determine the level of deterioration.

2. The system of claim 1, wherein the one or more light sources are light emitting diodes.

3. The system of claim 1, wherein the one or more light sources are lasers with line generating optics.

4. The system of claim 1, wherein the one or more stereoscopic image capturing devices comprise line scan cameras with frame grabbers.

5. The system of claim 1, further comprising a synchronization module adapted to receive a signal from the plurality of positioning sensors, and provide a sequence of triggers to the line scan cameras for time synchronized image capturing.

6. The system of claim 5, wherein the synchronization module is further adapted to provide a sequence of triggers to the one or more light sources for time synchronized illumination of the pavement surface for image capturing.

7. The system of claim 1, wherein the one or more computer processors is further adapted to correlate the 3D elevation data with image intensity data to identify distressed regions of pavement in the stereoscopic 3D image.

8. The system of claim 7, wherein the one or more computer processors is further adapted to color-code the identified distressed regions of pavement in different colors to indicate the level of severity.

9. The system of claim 1, further comprising optical filters matched to the selected wavelength of the one or more light sources for filtering the images of the illuminated pavement surface.

10. The system of claim 1, further comprising polarizing filters for filtering the images of the illuminated pavement surface.

11. A mobile pavement surface scanning method, comprising:
   illuminating a pavement surface at a selected wavelength utilizing one or more light sources;
   capturing sequential images of the illuminated pavement surface utilizing one or more stereoscopic image capturing devices, the sequential images comprising intensity image pairs;
   utilizing a plurality of positioning sensors, encoding movement and providing a synchronization signal for the intensity image pairs captured by the one or more stereoscopic image capture devices; and
   utilizing one or more computer processors to:
     synchronize the intensity image pairs captured by each camera in the one or more stereoscopic image capturing devices;
     normalize the contrast of the intensity image pairs;
     rectify the intensity image pairs;
     calculate 3D elevation data for each point on the pavement surface using stereoscopic principles; and
     combine the contrast normalized intensity image pairs with the calculated 3D elevation data to create a stereoscopic 3D image for assessing the quality of the pavement surface using the 3D elevation data to determine the level of deterioration.

12. The method of claim 11, wherein the one or more light sources are light emitting diodes.

13. The method of claim 11, wherein the one or more light sources are lasers with line generating optics.

14. The method of claim 11, wherein the one or more stereoscopic image capturing devices comprise line scan cameras with frame grabbers.

15. The method of claim 11, further comprising receiving at a synchronization module a signal from the plurality of positioning sensors, and providing a sequence of triggers to the line scan cameras for time synchronized image capturing.

16. The method of claim 15, further comprising adapting the synchronization module to provide a sequence of triggers to the one or more light sources for time synchronized illumination of the pavement surface for image capturing.

17. The method of claim 11, further comprising correlating the 3D range data with image intensity data to identify distressed regions of pavement.

18. The method of claim 17, further comprising color-coding the identified distressed regions of pavement in different colors to indicate the level of severity.

19. The method of claim 11, further comprising providing optical filters matched to the selected wavelength of the one or more light sources for filtering the images of the illuminated pavement surface.

20. The method of claim 11, further comprising providing polarizing filters for filtering the images of the illuminated pavement surface.

* * * * *